United States Patent [19]

Takahashi

[11] Patent Number: 5,131,585
[45] Date of Patent: Jul. 21, 1992

[54] METHOD FOR BRAZING WITH SIMULTANEOUS CARBURIZATION

[75] Inventor: Susumu Takahashi, Yokohama, Japan

[73] Assignee: Kanto Yakin Kogyo K.K., Japan

[21] Appl. No.: 710,676

[22] Filed: Jun. 5, 1991

[30] Foreign Application Priority Data

Jun. 12, 1990 [JP] Japan .................................. 2-153431

[51] Int. Cl.5 ............................................. B23K 31/02
[52] U.S. Cl. ............................... 228/220; 228/263.14; 148/210
[58] Field of Search ....................... 228/263.14, 263.15, 228/231, 219, 220; 148/19, 127

[56] References Cited

U.S. PATENT DOCUMENTS 4,294,395 10/1981 Nayer .............................. 228/263.15
4,869,420 9/1989 Kessler, Jr. .......................... 228/231

FOREIGN PATENT DOCUMENTS 1089170 4/1984 U.S.S.R. .

Primary Examiner—Richard K. Seidel
Assistant Examiner—James Miner
Attorney, Agent, or Firm—Shlesinger, Fitzsimmons & Shlesinger

[57] ABSTRACT

A ferric article is brazed by a copper solder at a temperature of or higher than 1,100° C. in a heat-treatment furnace, parts of the article which are desired to be carburized, are carburized simultaneously with the brazing by covering with organic materials such as an old newspaper and the like.

3 Claims, 2 Drawing Sheets

METHOD FOR BRAZING WITH SIMULTANEOUS CARBURIZATION

BACKGROUND OF THE INVENTION

This invention relates to a heat treatment method by which the brazing of ferric articles and their carburization are simultaneously made.

As a method for joining ferric machinery articles, it is known to braze them in a specific furnace atmosphere and without employing any flux. This kind of brazing method is free from adversely affecting qualities of articles to be treated, and suitable for treating a number of articles in succession. Carburization is also known to improve anti-abrasion and anti-fatigue characteristics of outer surfaces of ferric articles by having carbon penetrated from the outer surfaces and diffused inwardly to form hardened layers.

Generally, the aforementioned kind of brazing and carburization are made separately in independent furnaces. However, an example is described in Japanese Patent Publication No. 58-3792, in which the brazing and carburization of ferric parts are made in a single furnace. In this instance, the parts are brazed in a brazing zone kept at about 1,120° C., and then, transferred into a carburization zone which succeeds to the brazing zone of the same furnace and which are divided to three zonal chambers each kept at about 1,000° C., 950° C., and 850° C. In said zonal chambers, in which a temperature of an endothermic or exothermic atmosphere gas is lowered stepwise to the above-mentioned degrees, carburization is made by adding a hydrocarbon gas to the atmosphere gas.

This method is advantageous, compared to conventional two-process methods, since it does not require to heat articles once again from the beginning for the carburization thereof, it minimizes installations, and it requires less manpower, whereby processing costs will be reduced. However, it is very difficult though not impossible to control a carburization atmosphere accurately under predetermined temperatures in each zonal chambers, or to control, in other words, gas potentials as desired in each zonal chambers, because the zonal chambers can not be exactly separated to each other. It is disadvantageous in this method that when an exothermic gas is added by hydrocarbon gas so that it can have a carbon potential of about 1.0% carbon and accordingly it can be effective to perform carburization, the chambers will be sooted.

In another example in which the brazing and carburization are made simultaneously in a single furnace, its brazing has to be made at a temperature suited to carburization, viz., 900-950° C. This compels to use solders made from Cu or Ag alloys which have a low melting point, and excludes the employment of pure copper as a solder, although the pure copper is the most stable materials for brazing ferric or steel articles and inexpensive.

It shall be noted also that the aforementioned conventional carburization methods are for making the carburization of the whole parts of articles, and that they do not aim to carburize selected parts only of the articles. As explained above, it is possible only with much disadvantages such as the occurrence of soot to control an exothermic gas so that it can have a carbon potential of about 1.0% carbon or to control an endothermic gas so that it can have a carbon potential of 0.9% carbon, if carburization is to be made at a brazing temperature suitable to the use of copper solders, viz., 1,120–1,130° C. The brazing is, therefore, conducted at said temperature range of 1,120–1,130° C. first and separately from the carburization. Then, articles which have been brazed, are transferred to another chamber or furnace, whereby the articles will have been cooled. The articles are reheated to have a temperature suited for the carburization, that is, about 900–1,000° C., at which temperature an atmospheric gas can readily be controlled to have a carbon potential proper to the carburization. This way of processing looks like merely training a brazing furnace and a carburizing furnace Especially when an elongated furnace with continuously moving conveyor belts is employed, it becomes more difficult to control a furnace atmosphere so that it has a constant carbon potential, because the temperature of such furnace atmosphere differs at each zones such as preheating, heating, and cooling zones, while a carbon potential is greatly dependent upon a temperature.

BRIEF DESCRIPTION OF THE INVENTION

In view of the above, this invention is to provide a method for carburizing of selected parts only of ferric articles, simultaneously with the brazing of said articles by copper solders in a conventional brazing furnace employing an gas exothermic gas atmosphere, in which method the carburization and the brazing do not impose any limitation or restriction to each other operations.

Brazing of ferric or steel articles by copper solders is general performed by elevating their temperatures in a furnace atmosphere of an exothermic gas made from LPG such as propane and butane, and then by having the copper solders melted at 1,130° C. on selected parts of articles to be brazed. Such gas is typically consisted of $H_2$ (8.74%), CO (8.75%), $N_2$ (73.29%), $H_2O$ (0.86%), and $CO_2$ (8.37%). The gas atmosphere such constituents is brought about to equilibrium in a zone of about 1,100° C., and is then reductive to steel and copper, whereby molten copper spreads well over steel surfaces to be brazed and is well wettable with steel to produce good brazed articles. However, since a carbon potential the atmosphere gas of said constituents has against steel at 1,100° C. is lower than 0.001% carbon, it can hardly be effective to make carburization even if it is added by hydrocarbon gas.

Even under such circumstances of gas atmosphere which are most suitable for copper brazing but are not capable to make carburization, the carburization of ferric or steel articles, particularly carburization of selected portions of such articles is achieved in this invention.

To wit, in this invention, those parts of articles to be carburized are coated cr covered by such solid or liquid organic or carbohydrate materials which contain oxygen and produce CO and $H_2$ when heated, and the surfaces of the organic or carbohydrate materials are protected, after they have been dried, by metallic covers, ceramics of low permeability, carbonous heat-resisting coatings or adhesives. The articles thus prepared are subjected to brazing in a furnace, whereby they are brazed and their selected parts are simultaneously carburized.

For example, an old newspaper is employed as carbohydrate materials. The paper which has been impregnated with a 5% aqueous suspension of pulverized barium carbonate ($BaCO_3$), is wound up or applied over parts of articles to be carburized. After the newspaper wound up over the parts are covered and protected by graphitic adhesives and dried, the articles are brazed and simultaneously carburized in an exothermic gas atmosphere in a brazing furnace. This gas atmosphere may be replaced by an endothermic gas, inert gas, or hydrogen gas. Newspapers which can be expressed chemically as $C_6H_{12}O_6$, are converted to CO and $H_2$ of about 50% each when they are hermetically heated to a high temperature.

At the highest temperature of 1,130° C. of a copper brazing operation, carbon potentials of newspapers thus thermally converted, are $CO/CO_2 = 50/0.09$, viz., about 0.97% carbon, which are proper for carburization.

Carburization is made at a certain stage during articles proceed in a furnace and are heated and cooled from 900 to 1,130° C. and then again to 900° C. For example, when a temperature curve of gas atmosphere in a continuous conveyor belt type brazing furnace is set to be most proper to copper brazing, the travelling time required for the conveyor belt to pass through the furnace is generally made 15 to 30 minutes. In other words, articles to be brazed and simultaneously be carburized pass through the furnace in 15 to 30 minutes. Although the articles are subjected to carburization for 4 to 5 minutes only among said 15 to 30 minutes, they are carburized well in this invention to have a carburization depth of 0.3 to 0.4mm, primarily on account of the carburization being made in this invention at a temperature as high as 1,100° C., and preferably or additionally being assisted by a catalystic function by $BaCO_3$.

This invention will be explained below more in concrete by the following example and with reference to the accompanying drawings.

EXAMPLE

Figure 1:
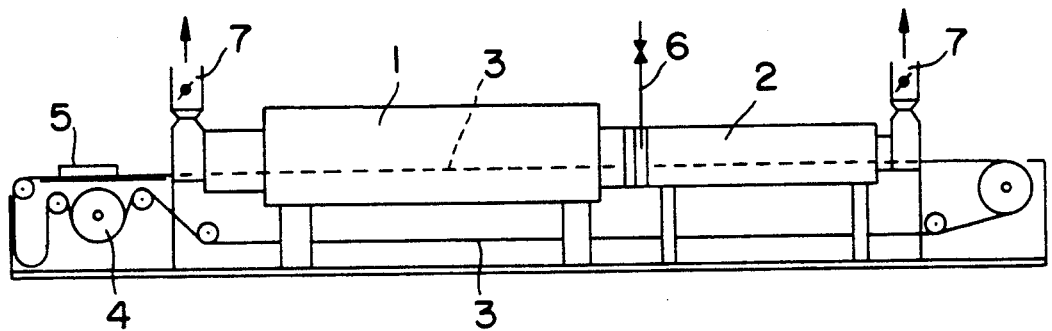
FIG. 1 is an explanatory side view partly in section of one of conventional continuous furnaces, which is employed to perform brazing and carburization simultaneously in accordance with this invention.

A furnace for brazing steel articles by means of copper solders which is shown in FIG. 1, was employed. The furnace was mounted with an endless meshed conveyor belt made of a heat-resistant steel, and employed as a reductive atmosphere therein an exothermic gas prepared from hydrocarbon such as propane and butane.

Figure 2:
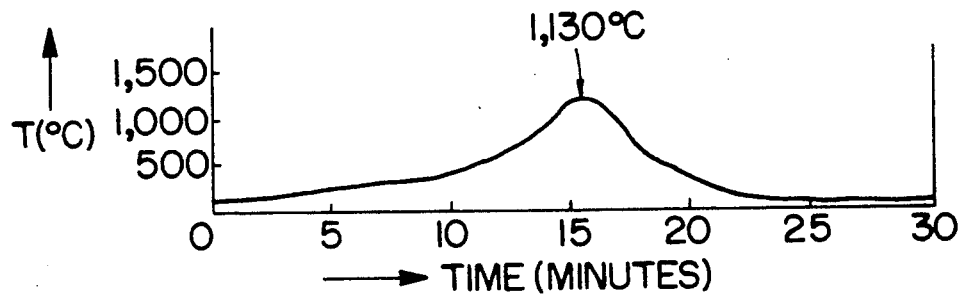
FIG. 2 shows a temperature curve by which the furnace is operated.

The furnace had a heating chamber 1, which was communicated to a cooling chamber 2. The conveyor belt 3 was circulated through the heating and cooling chambers, being driven by driving means 4. Articles 5 which were made of steel in this example and were to be treated in the furnace, were conveyed through the furnace, being mounted upon the conveyor belt 3. Numeral 6 is an inlet for sending into the furnace the above-mentioned atmosphere gas, while numerals 7 indicate an outlet for said gas. Brazing temperature was made 1,130° C. at the highest, as shown in FIG. 2, and the articles 5 passed through the furnace in about 30 minutes.

Constituents of the exothermic gas employed after it had been dehydrated by cooling it to 5° C., were as follows.

$CO\% = 8.75$, $CO_2\% = 8.37$, $H_2\% = 8.74$, $H_2O\% = 0.86$, and $N_2\% = 73.29$ The gas having said constituents is reductive against steel, because its carbon potentials at 1,130° C. are as low as only 0.001% carbon only which are of decarburizing characteristics.

Figure 3:
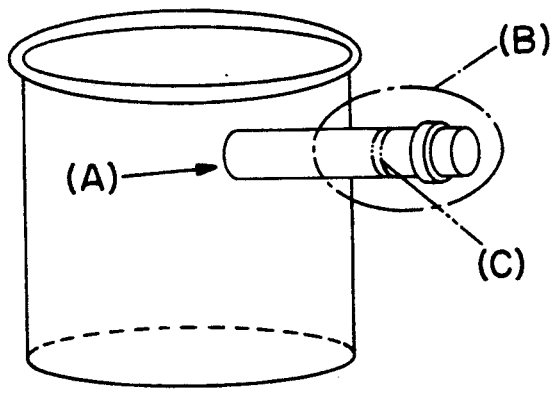
FIG. 3 is an explanatory perspective view of steel article which was treated in the following example.

Under the above conditions, to a side of a steel bucket a steel pipe which had been temporarily joined to said side, was fixedly brazed by a pure copper solder at $\underline{A}$, as shown in FIG. 3, while the portion $\underline{B}$ of the pipe was carburized.

The portion $\underline{B}$ of the pipe was wound up in a thickness of about 1mm by a newspaper impregnated with a 5% aqueous suspension of barium carbonate, and after said newspaper had been dried, its outer surface was protectively coated by graphitic adhesives and dried again.

The steel bucket and pipe thus prepared and with the pure copper solder at the location $\underline{A}$, were travelled through the furnace under the heat curve shown in FIG. 2, primarily in 20 order to copper braze the location $\underline{A}$, while secondarily to carburize the portion $\underline{B}$.

Figure 4:
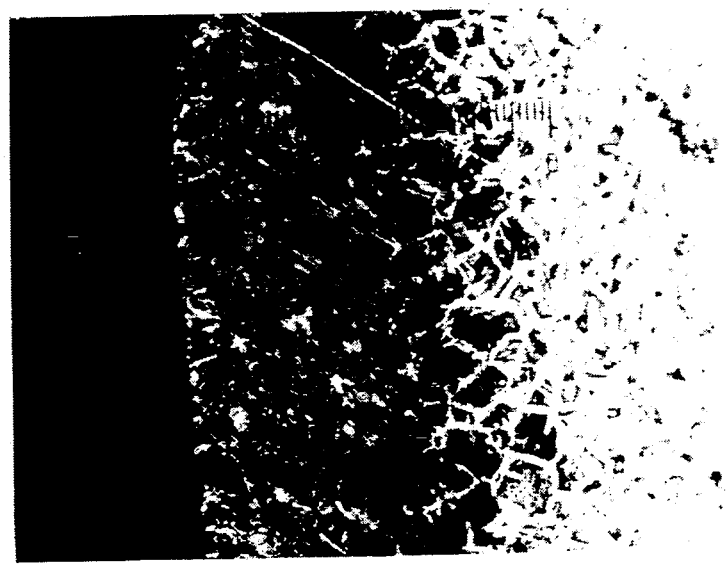
FIG. 4 is a microscopic picture (X 100), showing carburized structures of the article at portion $\underline{B}$ thereof cut out vertically.

The part location $\underline{A}$ was brazed satisfactorily. In order to know how the portion $\underline{B}$ was carburized, the pipe was cut at $\underline{C}$ shown in FIG. 3. A microscopic picture of said cut-out portion of pipe was as shown in FIG. 4, in which a whitish part in the right side in the picture is a natural structure of the steel pipe, while a blackish part having a curved outline next to and in the left side of the whitish part is a carburized layer having a depth of about 0.4mm.

Further, in order to affirm effects achieved by this invention for the carburization, squeezing tests were made.

The results are as shown in the following Table 1.

TABLE 1

| (Squeezing Test) | Load |
|---|---|
| 1. Steel pipe subjected to conventional brazing heat treatment | 90 Kgf |
| 2. Steel pipe subjected to the brazing heat treatment in accordance with this invention | 160 Kgf |

As shown by the above Table 1, the pipe treated in accordance with this invention had a strength of about 1.77 times of the same pipe subjected to a conventional brazing heat treatment.

In addition to old newspapers employed in the above example as a carburizing agent, other materials were employed as shown in the following Table 2 in which respective carburization depth is also given.

Table 2

TABLE 2

| Carburization Agent | Carburized Depth (mm) |
|---|---|
| Cotton cloth | 0.40 |
| Phenolic fibers | 0.35 |
| Filter paper | 0.36 |
| Carbonic phenolic fibers | 0.15 |
| Carbon powders | less than 0.1 |

As described above, this invention can be carried with conventional brazing furnaces without any addition or modification thereto specifically for the carburization. This is one of the advantages of this invention, compared to other prior methods for the simultaneous brazing and carburization.

It is one of the advantageous effects of this invention that the carburization at a temperature as high as 1,100° C. is effectively operable in a comparatively short period of time, compared to other prior methods for the simultaneous brazing and carburization in which the carburizing at such high temperature is impossible.

Accordingly, this invention provides a novel brazing method accompanied with the simultaneous carburization, which is economic and requires less manpower.

I claim:

1. A method for brazing together two parts of a ferrous article, while simultaneously causing a selected portion of at least one of said parts to be carburized, comprising, initially securing said two parts together with a copper solder, covering said selected portion of said one part with oxygen containing organic materials, and then causing the article to be subjected to a brazing temperature at or higher than 1,100° C. in a reductive gas atmosphere in a heating furnace.

2. The method as claimed in claim 1, in which said organic materials are impregnated with a catalyst for accelerating the carburization of said selected portion of said one part.

3. The method as claimed in claim 2, including covering said organic materials with protective materials whereby said organic materials are sealed from the gas atmosphere in said furnace.

* * * * *